(12) United States Patent
Helmick

(10) Patent No.: US 7,687,934 B2
(45) Date of Patent: Mar. 30, 2010

(54) SYSTEM AND METHOD FOR MANAGING ENERGY USE IN AN ELECTRIC VEHICLE

(75) Inventor: Mark Helmick, Ventura, CA (US)

(73) Assignee: Village Renewables Fund LLC, Santa Barbara, CA (US)

( * ) Notice: Subject to any disclaimer, the term of this patent is extended or adjusted under 35 U.S.C. 154(b) by 95 days.

(21) Appl. No.: 12/157,925

(22) Filed: Jun. 13, 2008

(65) Prior Publication Data

US 2009/0309422 A1   Dec. 17, 2009

(51) Int. Cl.
   *B60L 1/00* (2006.01)

(52) U.S. Cl. .......................................... 307/9.1; 320/103

(58) Field of Classification Search ................... 307/9.1
   See application file for complete search history.

(56) References Cited

U.S. PATENT DOCUMENTS 6,049,141 A * 4/2000 Sieminski et al. ............. 307/44

* cited by examiner

*Primary Examiner*—Robert L. Deberadinis
(74) *Attorney, Agent, or Firm*—Clifford Kraft

(57) ABSTRACT

A method and system for using a secondary energy source with an electric or hybrid vehicle in a way that requires no interaction with the vehicle's on-board communications system or the vehicle's processors. The secondary energy source, which can be a battery pack or any energy storage device, can generally be charged at home or business using the 110 volt line. The energy from the secondary source can be metered into the system in a way that allows the primary battery state-of-charge to fluctuate normally. Most of the electrical energy propelling the vehicle can come from the secondary source. All of the regenerative energy from braking can go into the primary battery. A controller can control a regulator to regulate the amount of current flowing from the secondary source.

20 Claims, 3 Drawing Sheets

SYSTEM AND METHOD FOR MANAGING ENERGY USE IN AN ELECTRIC VEHICLE

BACKGROUND

1. Field of the Invention

The present invention relates generally to the field of electric-powered vehicles and more particularly to managing energy usage from a secondary battery or energy source to a hybrid or totally electric vehicle, especially one that uses regenerative braking.

2. Description of the Prior Art

A major advance in the field of hybrid electric vehicles was made when Toyota Corporation introduced the Prius, an electric vehicle that also has an internal combustion engine and uses the technology of regenerative breaking to convert kinetic energy from braking back into electrical energy rather than just heat. The future of motor vehicles seems to be heading in the general direction of this vehicle. This type of vehicle is typically supplied with a single, high voltage, primary battery. In the case of the Prius, the battery is a nickel metal hydride battery (NiMH) supplying around 273.6 volts with 6.5 ampere-hour capability. Some models have slightly different voltages and capabilities (for example, 201.6 volts, 288 volts, 6.0 ampere-hours). The Prius electric drive motor has a power capability of around 67 Hp (depending upon the year and model). Vehicles of this type usually contain processors that coordinate the battery, power train and regenerative systems like regenerative breaking. Communication between various systems on the vehicle use a digital bus known as a CAN bus.

The primary battery pack is usually supplied with electronics that can keep track of stored energy, or state-of-charge, in the primary battery. A control system attempts to keep the battery pack around 72% of maximum (between 65%-75% typically). This is generally a compromise between storing as much energy as possible and leaving some room for energy from the regenerative braking.

FIG. 1 shows a typical prior art hybrid vehicle system. A high voltage battery pack supplies current to an electric motor. The motor may be DC or AC. If an AC motor is used, an inverter converts DC to AC for the motor. This motor drives the wheels when the vehicle is being operated electrically. A Battery electronics unit monitors the battery's state-of-charge and regulates charging and discharging. The battery is typically charged by the internal combustion engine (not shown) or by energy recovered in regenerative braking. A motor/generator is coupled to the wheels or drive train to act as a generator during braking. This unit can also act as a starter motor to start the internal combustion engine.

Because typically the primary battery pack is charged by the internal combustion engine, and because the vehicle only has a certain range in electric mode (EV mode), it can be very desirable to install a secondary battery pack in the vehicle. This way the vehicle can use energy stored in the secondary pack as well as the primary vastly extending the electric range of the vehicle. The secondary pack can be charged at home or business from 110 AC line service. This results in greater fuel economy since electricity is less expensive than gasoline per KW of usable energy.

There are two major difficulties in adding a second battery pack or other secondary energy source to this type of vehicle. The first is coercing the vehicle to use the available energy. Hybrid vehicles typically keep track of how much energy is stored in the primary battery. This is called the state-of-charge. If the state-of-charge is too low, then the internal combustion engine turns on to charge the battery. If the state-of-charge is too high, then the regenerative braking is disabled. In both cases, the advantages of hybrid technology is lost. Simply transferring energy from a secondary battery to the primary battery will cause the state-of-charge to reach levels that are too high to use regenerative braking. Hence braking energy will be unrecoverable. The second major difficulty with adding a secondary battery pack is metering energy from the secondary battery to the vehicle. Current control of some type is generally necessary to prevent large currents between the batteries.

There are systems known in the art for adding a second battery to a hybrid vehicle. Some are after-market. Various of these systems use a CAN bus monitoring device to decode vehicle communications and only transfer energy from the secondary battery when the state-of-charge is below some threshold. Some prior art systems transfer energy by having a secondary battery voltage that is higher than that of the primary battery and then connecting the packs together with a contactor. This approach may result in very high currents between the batteries that can result in battery overheating and even be a fire danger. Some prior art systems use a regulator circuit to adjust the voltage on the secondary battery to match that of the primary battery and hence limit the current. This approach allows the voltage of the secondary battery to be different from that of the primary battery, for example half. These methods almost exclusively require tapping into the CAN bus or other vehicle communications and then using the communications information to manage energy.

It would be advantageous to have a system and method of adding a secondary battery to an electric or hybrid vehicle like the Prius that would not require any interaction with the onboard vehicle communications system or any knowledge of the vehicle's controllers or processors. In this way, an external source-chargeable secondary battery pack could be added to extend the electric range of the vehicle and reduce the use of the internal combustion engine while maintaining battery currents and temperatures within safe ranges and allowing for the maximum use of regenerative energy systems like regenerative braking.

SUMMARY OF THE INVENTION

The present invention relates to the use of a secondary battery pack or secondary energy source with an electric or hybrid vehicle in a way that requires no interaction with the vehicle's on-board communications system or the vehicle's processors. The secondary energy source, if it is a battery, can generally be charged at home or business using the 110 volt line. The energy from the secondary battery can be metered into the system in a way that allows the primary battery state-of-charge to fluctuate normally. Most of the electrical energy propelling the vehicle can come from the secondary energy source until it is depleted to a preset level. All of the regenerative energy from braking can go into the primary battery, as designed by the manufacturer.

In one embodiment of the present invention, the secondary energy source has a voltage that is higher than that of the primary pack. A "buck mode" regulator circuit can be placed between the secondary pack and the high voltage line running from the primary pack to the vehicle drive line. A current measuring sensor can be placed on the output of the primary battery pack to monitor current flowing in and out of the primary pack. A second current monitoring sensor can be placed on the output of the secondary pack or on the output of a regulator. A processor or controller can monitor the currents and control the regulator. When the current flowing out of the primary pack exceeds a particular threshold, the regulator generally adds current to the system. When energy is flowing back into the primary pack due to charging from the drive-line or from regenerative breaking, the secondary system normally shuts off. To force the vehicle to use all of the preset energy in the secondary pack, or all energy set as available from the secondary energy source, the ratio of the current contributed by the secondary pack to that contributed by the primary pack should under normal conditions be chosen to be within set parameters near the operating capacity. In another embodiment of the present invention, the voltage of the secondary energy source can be lower than that of the primary battery pack. In this case a "boost mode" regulator can be utilized.

DESCRIPTION OF THE FIGURES

Attention is now directed to several drawings which describe aspects of the present invention.

Several drawings and illustrations have been presented to aid in understanding the present invention. The scope of the present invention is not limited to what is shown in the figures.

DESCRIPTION OF THE INVENTION

Figure 1:
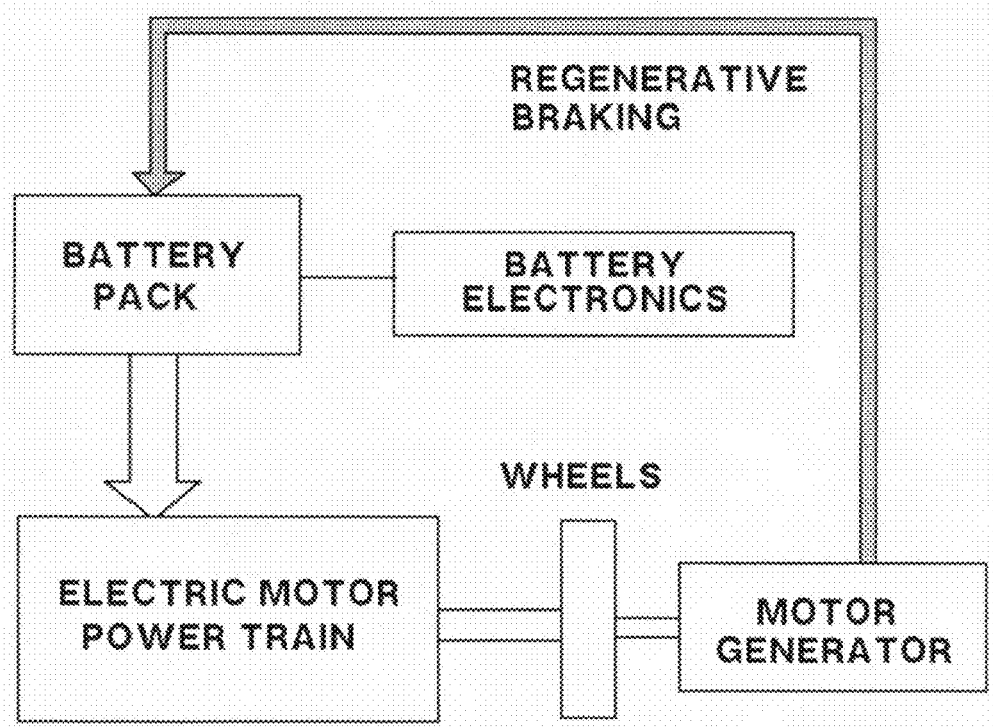
FIG. 1 shows a prior art hybrid vehicle system with a single battery pack.
Figure 2:
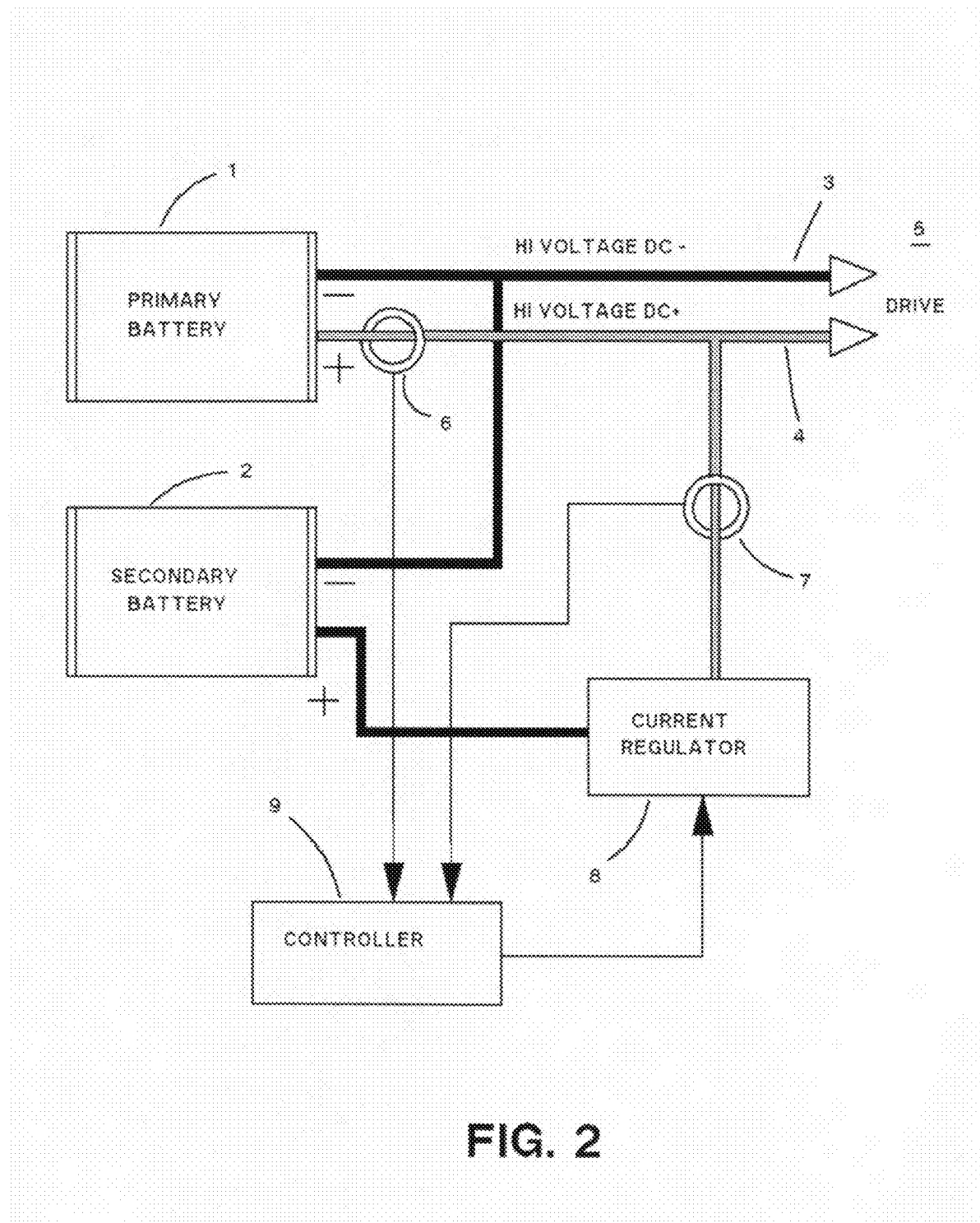
FIG. 2 shows a block diagram of a system with a secondary battery, two current sensors and a current regulator.

The present invention relates to putting a secondary energy source in an electric or hybrid vehicle like a Toyota Prius or other vehicle. The secondary energy source is included in a way that requires no interaction with the vehicle's on-board communications system or the vehicle's processors. The secondary energy source, if it is a battery pack, can generally be charged at home or business using the 110 volt line. FIG. 2 shows a block diagram of a particular embodiment of the present invention using a battery as a secondary energy source. It should be realized that any secondary energy source can be used and is within the scope of the present invention including a fuel cell or any other source of electric power. The present invention also applies to any type of electric system or vehicle that itself can have any type of primary energy source. As shown in FIG. 2, a primary battery 1 drives DC current into the vehicle load 5 through a high voltage DC bus containing a + line 4 and a − line 3. A secondary battery 2 is placed generally in parallel with the primary battery 1 with a regulator 8 controlling current out of the secondary battery 2. A current sensor 6 monitors current on the positive conductor of the primary battery 1. A second current sensor 7 monitors current passing from the secondary battery 2 through the regulator 8 and into the drive load 5. A controller 9 reads the currents from the first and second current sensors and controls current flow by controlling the regulator 8. The controller 9 which can be a digital controller, a microprocessor, an analog controller or circuit, or any other type of controller or control circuit allows most of the drive current for electric or EV mode driving to come from the secondary battery 2. During regenerative breaking, the controller 9 shuts off the regulator 8 and allows regenerative current to charge the primary battery 1. The controller 9 generally attempts to keep the state-of-charge of the primary battery around 72% so that there is plenty of capacity for regenerative charging. To do this, the controller 9 allows a percentage of the load current to be supplied by the primary battery 1. A second current sensor 7 monitors current being supplied into the load by the secondary battery 2.

Figure 3:
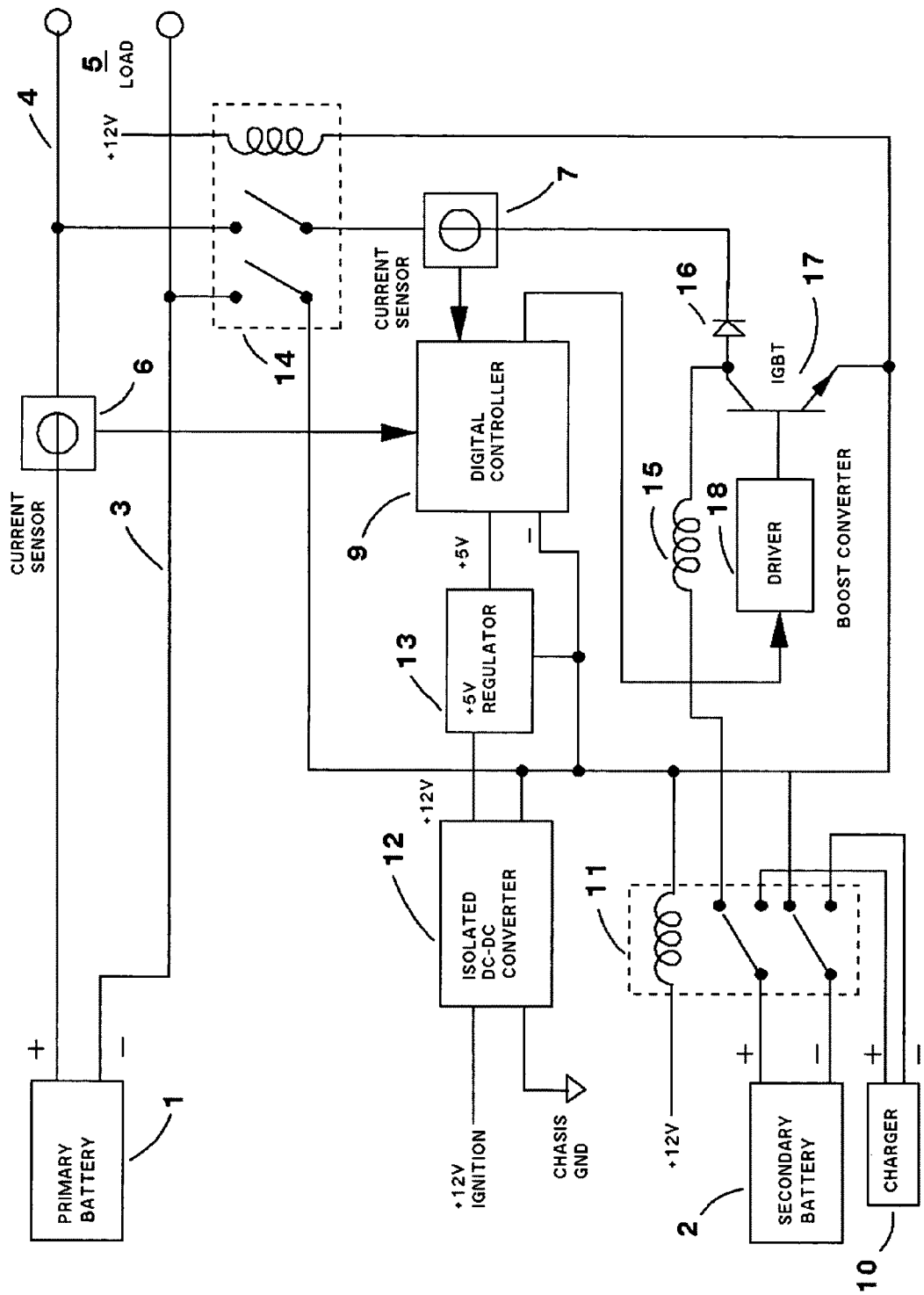
FIG. 3 shows a schematic diagram of an embodiment of the present invention using a "boost mode" regulator.

FIG. 3 shows a more detailed schematic diagram of a possible embodiment of FIG. 2. The primary battery 1 supplies current to the load 5 through a current sensor 6 that is tied back to a digital controller 9. A contactor 14 separates the secondary battery circuit from the primary battery circuit. When this contactor 14 is open, the secondary battery circuit is totally disconnected from the primary battery circuit. A second contactor 11 is connected directly across the secondary battery 2. Generally, turning on the ignition causes both contactors 14, 11 to connect the secondary battery into the vehicle. The ignition voltage (which has a chassis return) drives an isolated DC-DC converter 12 to produce a floating 12 volts. The reason for this is that the negative side of the primary battery on most high voltage hybrid vehicles is not grounded to the chassis. The isolated 12 volts from the DC-DC converter 12 drives the contactor coils and is connected to a 5 volt regulator 13 that outputs 5 volts to power the digital controller 9.

A boost converter current regulator is shown in FIG. 3 that includes an insulated gate bipolar transistor IGBT 17, diode 16, inductor 15 and driver 19 and is connected between the secondary battery 2 (through the contactor 11) and the drive load 5 (through the contactor 14). It should be noted that a boost regulator is shown in this particular embodiment; however, a buck regulator or any other type of current regulator may be used and is within the scope of the present invention depending upon the voltages selected. If the secondary battery voltage is lower than that of the primary battery pack, a boost converter can be used to step the voltage up. On the other hand, if the secondary battery voltage is higher, a buck converter can step the voltage down. If it is desired to allow the secondary battery voltage to be either higher or lower than the primary voltage, a buck-boost converter can be used. Any of these types of converter can also act as a current regulator. The transistor 17 in the boost converter is shown as an insulated gate bipolar transistor IGBT; however, it can be a power MOSFET or any other type of sold-state control device. The preferred device is an IGBT. The diode 16 prevents current from flowing from the load 5 or primary battery 1 into the transistor 17 or the secondary battery 2. The transistor 17 can generally be controlled using pulse-width modulation or any other control method.

When the contactor 11 is open due to the ignition being off, the secondary battery can be connected to a charger 10. This charger 10 can be integral with the secondary battery pack 2, or it can be a separate unit. This charger 10 allows the secondary battery 2 to be charged from a standard wall outlet at home or business.

As previously stated, when the vehicle is proceeding in electric or EV mode, the controller allows current to flow from the secondary battery to the load to drive the power train. During regenerative braking, the controller shuts down the regulator so that current can flow from the load into the primary battery. Inputs from the two current sensors are decoded to determine the operating condition. A possible control algorithm works as follows: when the current flowing out of the primary pack exceeds a threshold, the regulator adds current to the system. When energy is flowing back into the primary pack due to charging from the drive line or from regenerative braking, the secondary system turns off. To force the vehicle to use all of the preset energy in the secondary pack, the ratio of the current contributed by the secondary source to that contributed by the primary pack needs approximate the ratio of the operating capacity. For example, if the working capacity of the primary pack were 1 Ampere-Hour, and the capacity of the secondary source were chosen to be 5 Ampere-Hours, then the secondary source would need to supply 5 Amperes for every 1 Ampere supplied by the primary pack. In straight electric or EV mode, this would extend the electric range of the vehicle about six times. It should be noted that the foregoing example is given only to aid in understanding how the present invention functions. Any possible values could be substituted into this example. The scope of the present invention is not limited to this example or any examples or diagrams presented.

A particular problem can arise in repeated starting and stopping. In this case, most of the starting energy is coming from the secondary source, and all of the regenerated energy is going to the primary pack. This can drive the state-of-charge of the primary pack up to around full, which will disable any further regenerated charging. This problem can be alleviated by having the controller reduce the contribution from the secondary source until the time integral of the current from the primary pack insures that there is room in the primary pack for regenerative charging.

The method and system herein described show the electrical current being measured on the positive leads. It should be noted that the current could also be measured on the negative leads when the negative leads is the return path for the negative sides of the batteries. Further, the electrical currents can be measured on any two of the three legs. For example, in FIG. 2, either current sensor could be moved to point 4.

Several descriptions and illustrations have been presented to aid in understanding the present invention. One of skill in the art will realize that there are numerous changes and variations that can be made without departing from the spirit of the invention. Each of these changes and variations is within the scope of the present invention.

I claim:

1. A method for using a second energy source in an electric vehicle having a first energy source and energy regeneration comprising the steps of:
    electrically attaching said second energy source in parallel with said first energy source through a current regulator;
    sensing a first current flowing through said primary battery;
    sensing a second current flowing through said current regulator;
    controlling said current regulator to control current flowing out of said second energy source based on said first and second currents.

2. The method of claim 1 further comprising a controller that controls said current regulator based on said first and second currents.

3. The method of claim 1 wherein said current regulator is a boost regulator.

4. The method of claim 1 wherein said current regulator is a buck regulator.

5. The method of claim 1 further comprising the steps of disconnecting said second energy source from said vehicle and charging said second energy source with a charger.

6. The method of claim 2 wherein said controller is a digital controller.

7. The method of claim 2 wherein said controller is a microprocessor.

8. The method of claim 2 wherein said controller is an analog controller.

9. The method of claim 1 further comprising the steps of:
    sending an electrical command to said current regulator to allow current to flow out of said second energy source when said first current is flowing out of said first energy source, and exceeds a particular threshold;
    sending an electrical command to said current regulator to prevent current from flowing out of said second energy source when said first current is flowing into said first energy source.

10. A secondary battery system for an electric vehicle of the type containing at least one primary battery and having energy regeneration comprising:
    a secondary battery;
    a current regulator, said current regulator connecting said secondary battery in parallel with said primary battery;
    a first current sensor that senses current into and out of said primary battery;
    a second current sensor that senses current through said current regulator;
    a controller electrically connected to said first and second current sensors and electrically connected to said current regulator;
    wherein, said controller controls current from said secondary battery according to current values measured by said first and second current sensors.

11. The secondary battery system of claim 10 wherein said current regulator is a boost regulator.

12. The secondary battery system of claim 10 wherein said current regulator is a buck regulator.

13. The secondary battery system of claim 10 wherein said secondary battery can be disconnected from said vehicle and charged with a battery charger.

14. The secondary battery system of claim 10 wherein said controller is a digital controller.

15. The secondary battery system of claim 10 wherein said controller is a microprocessor.

16. The secondary battery system of claim 10 wherein said controller contains software that performs the following steps:
    when said first current is flowing out of said primary battery and exceeds a particular threshold, sending an electrical command to said current regulator to allow current to flow out of said secondary battery;
    when said first current is flowing into said primary battery sending an electrical command to said current regulator to prevent current from flowing out of said secondary battery.

17. A secondary energy source for an electric vehicle having a primary energy source comprising:
    a source of electrical energy coupled into said vehicle through a regulator;
    a first current probe sensing current from said primary energy source;
    a second current probe sensing current from said source of electrical energy;
    a controller electrically connected to said regulator and said first and second current probes, said controller controlling current from said source of electrical energy into said vehicle.

18. The secondary energy source of claim 17 wherein said regulator is chosen from the group consisting of a boost regulator, a buck regulator and a buck-boost regulator.

19. The secondary energy source of claim 17 wherein said controller is chosen from the group consisting of a digital controller, a microprocessor and an analog controller.

20. The secondary energy source of claim 17 wherein said source of electrical energy is a battery.

* * * * *